United States Patent [19]

Dussan V. et al.

[11] Patent Number: 5,463,549
[45] Date of Patent: Oct. 31, 1995

[54] METHOD AND APPARATUS FOR DETERMINING PERMEABILITY OF SUBSURFACE FORMATIONS

[75] Inventors: Elizabeth B. Dussan V.; François M. Auzerais, both of Ridgefield; Barbara I. Anderson, Brookfield Center, all of Conn.

[73] Assignee: Schlumberger Technology Corporation, Ridgefield, Conn.

[21] Appl. No.: 137,826

[22] Filed: Oct. 15, 1993

[51] Int. Cl.$^6$ ..................................................... E21B 47/00
[52] U.S. Cl. ........................... 364/422; 324/339; 324/366
[58] Field of Search ..................................... 364/420, 421, 364/422; 324/323, 339, 366, 373, 377; 75/40–50; 73/152

[56] References Cited

U.S. PATENT DOCUMENTS

| | | | |
|---|---|---|---|
| 4,712,424 | 12/1987 | Herron | 73/152 |
| 4,742,459 | 5/1988 | Lasseter | 364/422 |
| 4,764,903 | 8/1988 | Siebert | 367/29 |
| 4,773,264 | 9/1988 | Herron | 73/152 |
| 4,858,198 | 8/1989 | Weissman | 367/29 |
| 4,873,488 | 10/1989 | Barber et al. | 324/339 |
| 4,890,487 | 1/1990 | Dussan V. et al. | 73/152 |
| 5,241,273 | 8/1993 | Luling | 324/338 |
| 5,310,013 | 5/1994 | Kishino et al. | 175/44 |
| 5,335,542 | 8/1994 | Ramakrishnan et al. | 73/152 |

OTHER PUBLICATIONS

H. G. Doll, "Filtrate Invasion In Highly Permeable Sands", The Petroleum Engineer, 1955.
Hunka et al., "A New Resistivity Measurement System For Deep Formation Imaging And High Resolution Formation Evaluation", SPE–20559, In Annual Technical Conference And Exhibition Proceedings, Formation Evaluation and Reservoir Geology, Society of Petroleum Engineers, 1991.
T. D. Barber, "Introduction To the Phasor Dual Induction Tool", Journal Of Petroleum Technology, Sep. 1985.
N. Schuster et al., "Application of the IFF/Sonic Combination Tool To Gulf Coast Formations", Gulf Coast Assoc. of Geological Societies Transactions, 1971.
Barber, "Phasor Induction Tool", Schlumberger WTS, 1989.
Singer et al., "The Effect Of Transition Zones On The Response Of Induction Logs", SWPA Annual Logging Symposium, 1988.
Allen et al., Invasion Revisited, Oilfield Review, 1991.
B. Anderson et al., "ELMOD—Putting Electromagnetic Modeling To Work To Improve Resistivity Log Interpretation", Transactions of SPWLA 30th Annual Logging Symposium, Jun., 1989.
A. Q. Howard, "A New Invasions Model For Resistivity Log Interpretation", The Log Analyst, Mar.–Apr., 1992.

*Primary Examiner*—Gail O. Hayes
*Assistant Examiner*—Joseph Thomas
*Attorney, Agent, or Firm*—Martin M. Novack; Leonard W. Pojunas

[57] ABSTRACT

Characteristics of invasion profiles exhibiting effects of gravity, and particularly their manifestations on resistivity logs of a plurality of different radial depths of investigation, are used to determine formation characteristics, including vertical permeability. One embodiment includes the following steps: suspending a logging tool in the borehole; producing a plurality of resistivity measurements, having respectively different radial depths of investigation, as the logging device is moved through the borehole, to obtain a plurality of resistivity logs; determining the presence of a buoyancy marker in the resistivity logs in a formation bed invaded with filtrate from the drilling mud, and the extent of the buoyancy marker; and determining permeability of the formations as a function of the extent of the buoyancy marker.

27 Claims, 9 Drawing Sheets

METHOD AND APPARATUS FOR DETERMINING PERMEABILITY OF SUBSURFACE FORMATIONS

BACKGROUND OF THE INVENTION

This invention relates to well logging of earth boreholes and, more particularly, to a method and apparatus for determining permeability of earth formations surrounding a borehole.

It is well known that during the drilling of an earth borehole, such as an oil or gas well, fluid in the drilling mud begins invading the surrounding formations, due to the difference in pressure between the mud in the well bore and the formation fluids. The extent of invasion depends upon various factors, including the nature of the mud cake formed on the well bore, and the porosity and permeability of the surrounding formations. Invasion by the mud filtrate in a given region of the well bore will typically continue for a period of time after the region has been drilled. Characteristics of the "invaded zone" are important in the determination of formation characteristics, and various types of well logging equipment can provide measurements of invaded zone parameters that are useful in formation evaluation.

Typically, the invasion profile around the well bore is considered to be generally cylindrical in shape. For example, in a particular region (or bed) of the formation, the invaded zone is normally visualized as a cylindrical annulus having a thickness that can vary from a fraction of an inch to several feet.

Although conventional well logging models assume a cylindrical invasion profile, it was recognized decades ago that the actual profile of invading fluid in a formation bed can be substantially affected by gravity. H. G. Doll noted that in salt-water bearing sands of high permeability, it was often observed that the depth of invasion by mud filtrate is quite small near the bottom boundaries of the beds, whereas the top parts of the beds are deeply penetrated. (H. G. Doll, "Filtrate Invasion In Highly Permeable Sands", H. G. Doll, The Petroleum Engineer, 1955). He indicated that this observation was brought to light by resistivity logs, in which the shallow investigation log gives the same very low readings as the deep investigation log over the lower part of the beds, and an appreciably higher reading over the upper part. This observation suggested to Doll that, in this kind of formation, after the mud filtrate has been forced through the mud cake, it does not flow horizontally into the formation, but has a tendency to rise, since it is often less saline (and therefore less dense) than the interstitial water originally located in the pores of the invaded formations. As a consequence of the difference in densities, the mud filtrate is subject to an ascensional force, and its velocity is the resultant of two components: one vertical (upward) component, caused by the ascensional force, and one horizontal (radial) component, due to the rate of filtration. Doll described the nature of the invasion front as it advances, with time, into the formation, and set forth a number of relationships representing the radial and vertical movement and positions of the advancing filtrate.

Although Doll's work laid a basic foundation for understanding vertical movement of the invading filtrate, succeeding years have produced little, if any, development on this basic foundation that has resulted in new and commercially useful techniques in the logging art for evaluating earth formations.

Determination of formation permeability, including the vertical and horizontal components thereof, is important in evaluating the behavior and producibility of a formation. However, it is generally considered difficult to obtain accurate permeability information, particularly from conventional types of logging measurements.

It is among the objects of the present invention to provide improved logging techniques and apparatus for evaluating earth formations surrounding a borehole to determine characteristics that are affected by the gravity-induced movement and location of invading fluids. It is also among the objects of the invention to provide improved technique and apparatus for determining permeability of earth formations.

SUMMARY OF THE INVENTION

In accordance with an aspect of the present invention, characteristics of invasion profiles exhibiting effects of gravity, and particularly their manifestations on resistivity logs of a plurality of different radial depths of investigation, are used to determine formation vertical permeability.

An embodiment of a method in accordance with an embodiment of the invention for determining the vertical permeability of formations surrounding a borehole drilled in the earth using drilling fluid, includes the following steps: suspending a logging tool in the borehole; producing a plurality of resistivity measurements (preferably at least three), having respectively different radial depths of investigation, as the logging device is moved through the borehole, to obtain a plurality of resistivity logs; determining the presence of a buoyancy marker in the resistivity logs in a formation bed invaded with filtrate from the drilling mud, and the extent of the buoyancy marker; and determining permeability of the formations as a function of the extent of the buoyancy marker. In a preferred embodiment of the invention, there is derived the elapsed time between the drilling of the portion of the borehole for which permeability is being determined and the logging of said resistivity measurements in said portion of the borehole, and permeability is determined as a function also of said elapsed time. In this embodiment, the buoyancy marker results from a curved segment in the invasion profile of the bed, and the extent of the marker is determined from the extent of a horn in the resistivity log which has the relatively shallowest radial depth of investigation of said resistivity logs. Also in this embodiment, the logging tool further includes means for generating a log indicative of bed boundaries, and the step of determining a buoyancy marker in the resistivity logs comprises locating said horn at one of the bed boundaries.

In accordance with a further feature of the invention, the acceptability of provisionally determined values of formation permeability, such as the vertical component thereof, is determined by generating a model invasion profile, generating simulated resistivity logs using the model invasion profile, and accepting the provisional value of permeability if the simulated logs compare favorably with the measured logs.

Further features and advantages of the invention will become more readily apparent from the following detailed description when taken in conjunction with the accompanying drawings.

DETAILED DESCRIPTION

Figure 1:
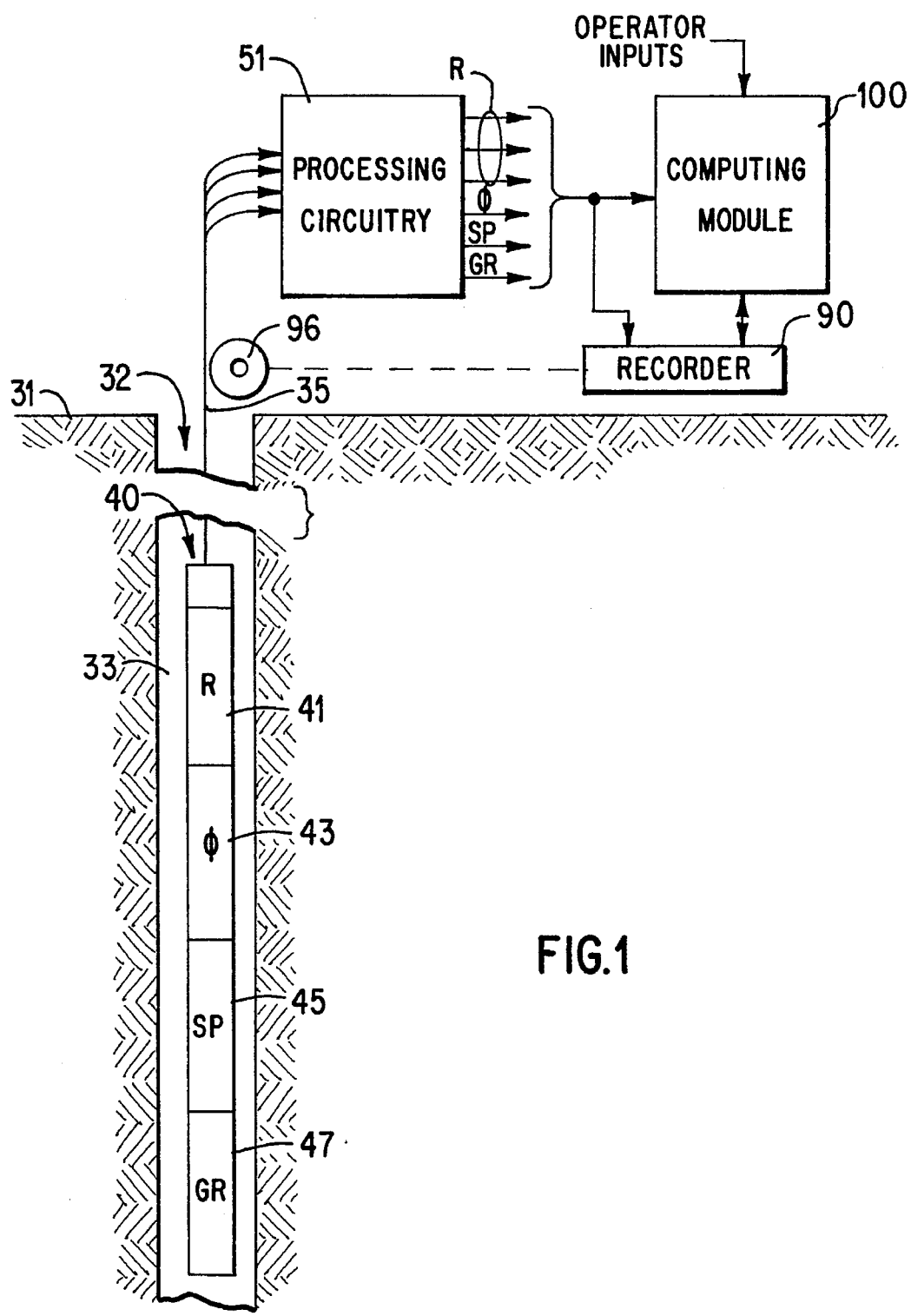
FIG. 1 is a block diagram, partially in schematic form, of an apparatus which can be used to practice an embodiment of the invention.

FIG. 1 shows an apparatus which can be used to practice an embodiment of the invention for investigation earth formations 31 traversed by a borehole 32, which is filled with a drilling fluid 33. The investigating apparatus or logging device 40 is suspended in the borehole 32 on an armored cable 35, the length of which substantially determines the depth of the downhole device 40. The cable length is controlled by conventional means at the surface (not shown). Circuitry 51, shown at the surface, although portions thereof may be downhole, represents processing circuitry for the various logging units of apparatus 40. A sheave wheel 96 can be conventionally provided for determination of depth of the logging apparatus, and signals therefrom are coupled with a recorder 90 which generically represents known graphical, electrical, and/or other storage and recording functions performed on signals received from processing circuitry 51 and from a computing module 100. The computing module 100, which in the illustrated embodiment receives inputs from the processing circuitry 51, can be implemented, for example, by a suitably programmed general purpose computer, such as a VAX, sold by Digital Equipment Corp. It will be understood, however, that a suitable special purpose digital or analog computer, which performs functions as described herein, could alternatively be employed.

The downhole device 40 comprises a tool string that includes several tools. In the present embodiment, the reference numeral 41 represents one or more resistivity tools which collectively include the capability of measuring resistivity at a plurality of radial depths of investigation and, preferably, at least three radial depths of investigation. It is well known in the art that one or more resistivity logging devices can be employed for this purpose. [Resistivity and conductivity are inverses, and it will be understood that references herein to resistivity imply that conductivity could be substituted, in an inverse sense.] A single device which obtains measurements at several radial depths of investigation is the so-called Array Induction Tool or "AIT", which employs an array of induction coils and signal processing in the obtainment of its resistivity measurements. Reference can be made, for example, to the U.S. Pat. No. 4,873,488 and to Hunka et al., "A New Resistivity Measurement System For Deep Formation Imaging And High Resolution Formation Evaluation", SPE-20559, In Annual Technical Conference And Exhibition Proceedings, Formation Evaluation and Reservoir Geology, Society of Petroleum Engineers, 1991. Another technique for obtaining resistivity measurements for at least three different depths of investigation is to utilize measurements from a so-called "DIT-SFL" (Dual Induction Tool—Spherically Focused Log) apparatus to obtain resistivity measurements at a shallow radial depth of investigation ("$R_{SFL}$") of about 16 inches, and at intermediate and deep radial depths of investigation ("$R_{ILM}$" and "$R_{ILD}$", respectively) of about 30 inches and 50 inches, respectively. [The terms "shallow", "intermediate", and "deep", as used herein, are relative terms.] Reference can be made to T. D. Barber, "Introduction To The Phasor Dual Induction Tool", Journal Of Petroleum Technology, September 1985; N. Schuster et al., "Application of the IFF/Sonic Combination Tool To Gulf Coast Formations", Gulf Coast Assoc. of Geological Societies Transactions, 1971; and Barber, "Phasor Induction Tool", Schlumberger WTS, 1989. It will be understood, however, that other resistivity logging device(s) can alternatively be employed.

The tool string of downhole apparatus 40 also includes, in this embodiment, a logging device 43 which is used to obtain measurements of porosity, $\phi$. This logging tool may comprise, for example, a conventional type of neutron logging device or a conventional type of acoustic logging device. Further included in the tool string of this embodiment is a static potential ("SP") logging device 45 and/or a conventional gamma ray ("GR") logging device 47, both of which are useful, inter alia, in obtaining indications of bed boundaries. The tool string can also typically include appropriate conventional telemetry equipment and power supplies (not separately shown), as well as other logging subassemblies conventionally used with equipment of this type. It will also be understood that at least some of the measurements hereof could be made by equipment on a drill string.

To facilitate understanding of the operation hereof, consider first an example, illustrated in FIGS. 2A–2D, of a model formation of the type treated by H. G. Doll (supra), wherein a vertical well bore traverses a single homogeneous horizontal bed, bounded by impermeable formations (e.g. shales), and having horizontal permeability, $k_h$, and vertical permeability, $k_v$. It is assumed that the well bore appears instantaneously in the bed at the time of drilling (t=0), with a mudcake in "dynamic equilibrium" with the conditions in the well, which implies that the invading filtrate enters the bed at a constant rate. This is good approximation of the generally understood dynamics of mudcake formation and invasion. [The volume of filtrate which invades the bed before a mud cake develops, is relatively small, and the amount of filtrate which invades the bed after static conditions prevail in the well is also relatively small.]

The radial (Darcy) speed at which the filtrate enters the formation, $u_f$, is assumed to be controlled by the properties of the mud. [The volume of filtrate per unit time per unit distance entering the formation is $u_f$ times the wellbore perimeter.] This is a direct consequence of the relatively large hydrodynamic resistance encountered by filtrate as it flows thorough the mud cake (as compared to the formation). This presumes the presence of a mud cake, implying $k_h$ of the bed is above some minimum value, typically at least 10 mD. Once the horizontal permeability exceeds this value (and a mud cake is present), then the specific value of $u_f$ is independent of $k_h$.

It is also assumed that the invasion process can be modeled by a saturation "step profile"; i.e., the filtrate saturation is a constant throughout the invaded zone, the annulus of connate water (situated between the filtrate and the formation fluid) is not included, and the effect of capillary forces or viscous instabilities can be ignored resulting in a transition zone (region between the filtrate and the formation fluid) having zero thickness. Rigorously speaking, these conditions model aqueous filtrate invading a water zone; however, they may also be appropriate in situations when the filtrate and the formation fluid consist of different phases. (See e.g. Singer et al., "The Effect Of Transition Zones On The Response Of Induction Logs", SWPA Annual Logging Symposium, 1988, and Allen et al., Invasion Revisited, Oilfield Review, 1991).

Figure 2A:
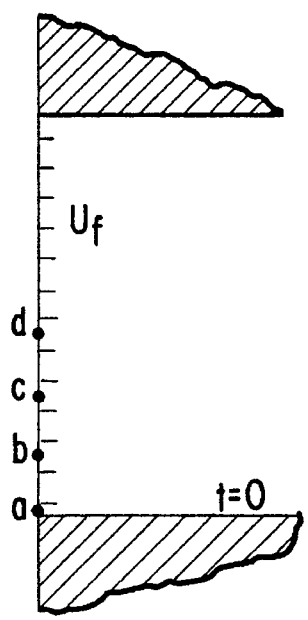
FIGS. 2A–2D illustrate the development of an invading filtrate front as a filtrate invades a bed in a situation where the invading filtrate is less dense than the formation fluid.
Figure 2B:
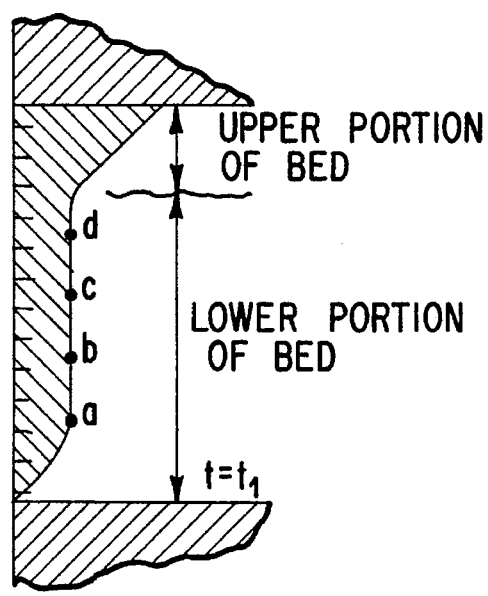
Figure 2C:
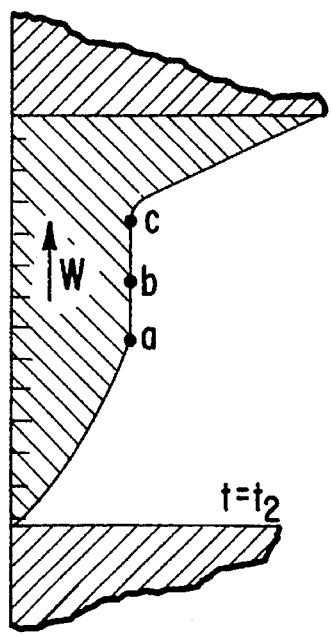
Figure 2D:
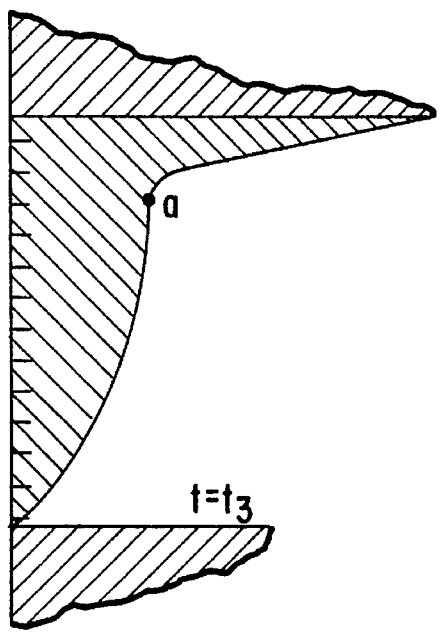

FIGS. 2A–2D illustrate the development of the filtrate front (see H. G. Doll, supra) as the filtrate invades the bed, in a situation where the invading filtrate is less dense than the formation, fluid. FIG. 2A represents time t=0, when invasion first starts, and identifies four filtrate material points in the wellbore wall as a, b, c, and d. FIGS. 2B, 2C, and 2D show the filtrate front, and the progress of the points a, b, c and d, at successively greater times, $t_1$, $t_2$ and $t_3$, respectively. Depending on the parameters involved, $t_1$, $t_2$ and $t_3$ may be, for example, about one day, five days, and ten days, respectively, after drilling. By the time $t_3$, the filtrate points b, c, and d have entered the upper portion of the bed, with the point a about to enter. Time $t_3$, in this example, is approximately the time, T, treated further below, that it takes for the vertical layer of the filtrate front to reach a steady state.

Figure 3:
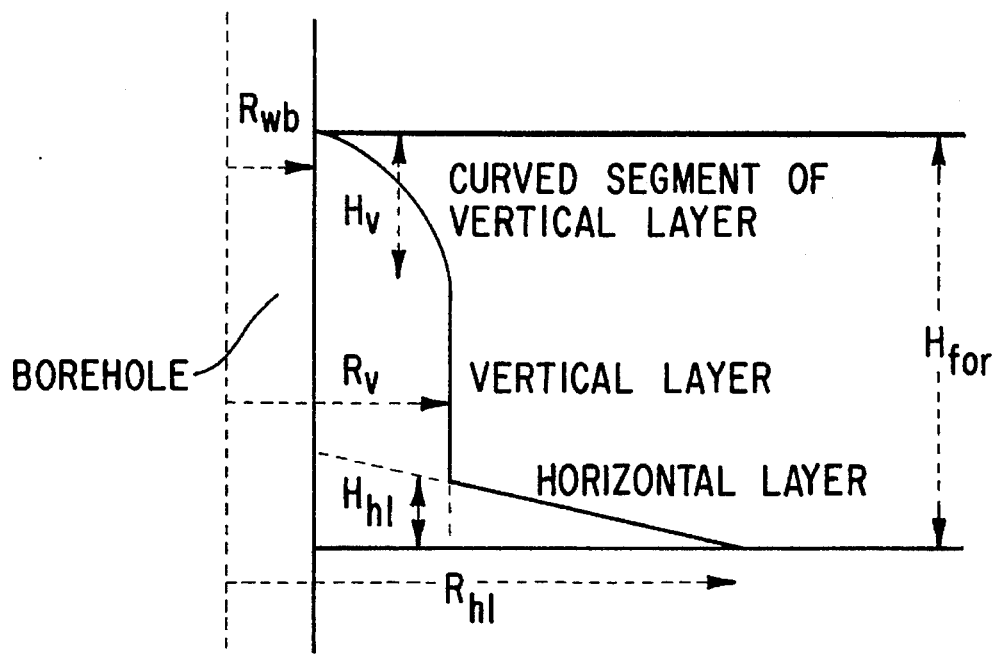
FIG. 3 illustrates an invasion profile in a situation where the invading filtrate is denser than the formation fluid, and before steady state is reached.
Figure 4:
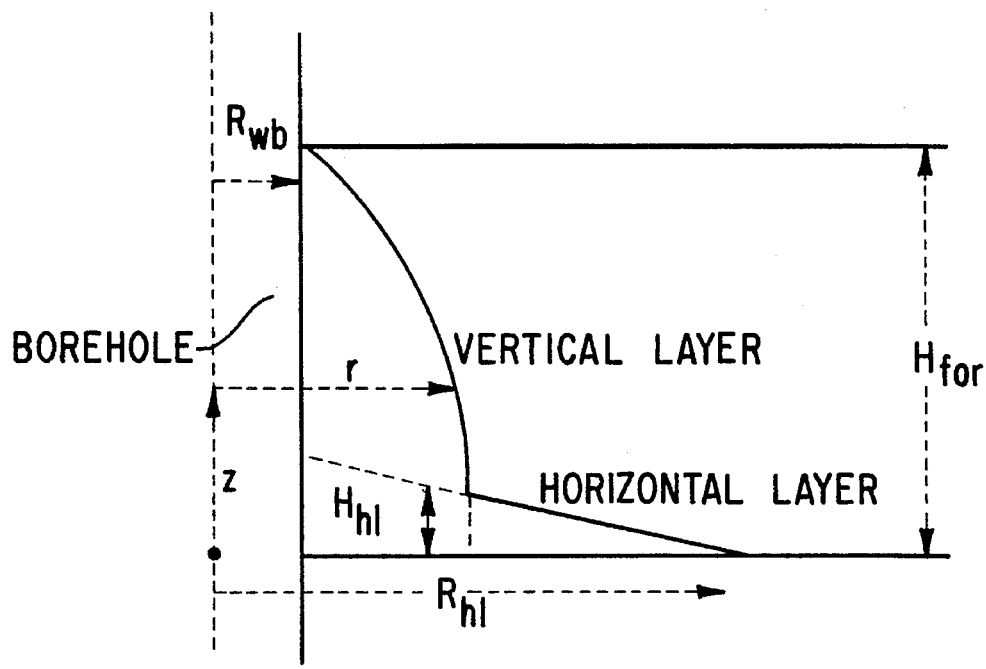
FIG. 4 illustrates an invasion profile in a situation where the invading filtrate is denser than the formation fluid, after steady state is reached.

The difference in densities between the filtrate and the formation fluid can have a positive or a negative value. [In FIGS. 2A–2D the filtrate is less dense than the formation fluid (e.g. fresh water filtrate invading saline formation fluid), so the filtrate rises, but if the filtrate were more dense than the formation fluid (e.g. water filtrate invading hydrocarbon formation fluid), the filtrate would fall.] Thus, the accumulate filtrate near a horizontal impermeable bed boundary will be referred to as the "horizontal layer", and the remainder of the filtrate front will be referred to as the vertical layer. [Initial reference can be made to FIGS. 3 and 4, which represent the case where the invading filtrate is denser than the formation fluid, and are upside-down approximate renditions of FIGS. 2C and 2D, respectively.] It is know (e.g. H. G. Doll, supra) that the velocity of the filtrate, $u_{fil}$, within the formation is given by $$u_{fil} = \frac{u_f R_{wb}}{r} \hat{r} + W\hat{z} \quad (1)$$

where $R_{wb}$ denotes the wellbore radius, and $\hat{r}$ and $\hat{z}$ denote, respectively, local unit vectors in the radial and axial directions of a cylindrical coordinate system (r, φ, z) whose z-axis coincides with the center of the wellbore and points upward (the plane z = 0 indicating the location of the lower impermeable bed boundary). The constant, W, is defined by $$W = (\rho_{for} - \rho_{fil})gk_v/\mu_{fil} \quad (2)$$

where ρ and μ denote, respectively, the density and the viscosity of the fluid (the subscripts "fil" and "for" referring to the filtrate and the formation fluid, respectively), and g denotes the gravitational constant (980 cm/sec$^2$). The radial component of filtrate velocity is identical to the case when the filtrate has the same density as the formation fluid. Its vertical component is a constant, W, not varying either with position within the formation or over time.

The filtrate velocity of equation (1) can be used to locate the filtrate points of FIGS. 2A–2D at the four successive times $t_1$, $t_2$, and $t_3$. At each time, all of the points have advanced into the formation the same distance, maintaining identical radial positions, and have risen vertically by the same amount, retaining their same vertical spacing until they have entered the upper portion of the bed. The "curved segment" of the vertical layer of the filtrate front, which begins to develop along its lower end, denotes the location of filtrate points which have entered the formation at position (r, z) = ($R_{wb}$, 0) at times later than t=0 (the φ-coordinate is not specified due to azimuthal symmetry). The vertical straight-line segment denotes the location of all the filtrate points at the wellbore wall at t=0. At time $\phi H_{for}/W$, denoted by T, the shape of the filtrate front has reached its steady state configuration, where φ denotes the porosity and $H_{for}$ denotes the bed thickness. This corresponds to the approximate time it takes the filtrate point located at ($R_{wb}$, 0) at time t=0 to travel to the upper part of the bed.

The location of the filtrate front vertical layer, prior to steady state (i.e. t ≦ T), is $$r = \sqrt{R_{wb}^2 + 2R_{wb}u_f\mu_{fil}(H_{for}-z)/\Delta\rho g k_v} \quad (3)$$

where Δρ is the filtrate density minus the formation fluid density and, as noted above, $R_{wb}$ is the radius of the wellbore, and $u_f$ is the radial speed of the filtrate as it enters the bed at the wellbore wall (as represented by equation (1)), and t is the time of observation. The time to steady state, T, is $$T = H_{for}\mu_{fil}\phi/k_v\Delta\rho g \quad (4)$$

The equation (3) applies to the "curved segment" of the vertical layer which, in FIG. 3, is adjacent to the top of the permeable bed [$(1-t_{log}/T)H_{for} < z < H_{for}$ in FIG. 3], and has a vertical extent, $H_v$. Below the curved segment [$0 < z < (1-t_{log}/T)H_{for}$ in FIG. 3], the vertical layer is represented by $$R_v = \sqrt{R_{wb}^2 + 2R_{wb}u_f t_{log}/\phi} \quad (5)$$

After steady state (t ≧ T), the equation (3) applies to the entire vertical layer (see steady vertical layer illustration of FIG. 4).

Referring again to the invasion profile prior to steady state (t ≦ T) of FIG. 3, the vertical extent of the curved segment of the vertical layer is given by $$H_v = \frac{\Delta\rho g k_v}{\phi\mu_{fil}} t_{log} \quad (6)$$

Applicants have determined that, for t ≦ T, the horizontal and vertical extents of the horizontal layer can be represented as:

$$R_{h1} = (1.62) \left( \frac{R_{wb} u_f (\Delta \rho)^2 g^2 k_h k_v}{2\phi^3 \mu_{fil}^2} \right)^{1/4} t_{log}^{3/4} \quad (7)$$

$$H_{h1} = (2.62) \left( R_{wb} u_f \frac{k_v}{2\phi k_h} \right)^{1/2} t_{log}^{1/2} f(\eta_v), \quad (8)$$

where $$\eta_v = \left( 1 + \frac{2u_f t_{log}}{R_{wb} \phi} \right)^{1/2} \frac{R_{wb}}{R_{h1} t_{log}},$$

$$f(\eta_v) = -22.315 \eta_v^7 + 92.053 \eta_v^6 - 157.38 \eta_v^5 + 144.76 \eta_v^4 - 78.201 \eta_v^3 + 25.823 \eta_v^2 - 6.1983 \eta_v + 1.4485$$

and for the case for $t \geq T$, the horizontal and vertical extents of the horizontal layer can be represented as:

$$R_{h1} = 1.83 \left( \frac{R_{wb} u_f \Delta \rho g k_h H_{for}}{\phi^2 \mu_{fil}} \right)^{1/4} (t_{log} - T/2)^{1/2} \quad (9)$$

$$H_{h1} = 3.35 \left( \frac{R_{wb} u_f \mu_{fil} H_{for}}{\Delta \rho g k_h} \right)^{1/2} f(\eta_v),$$

where $$\eta_v = \left( 1 + \frac{2u_f \mu_{fil} H_{for}}{R_{wb} \Delta \rho g k_v} \right)^{1/2} \frac{R_{wb}}{R_{h1} t_{log}}, \quad (10)$$

$$f(\eta_v) = -12.139 \eta_v^7 + 50.072 \eta_v^6 - 85.598 \eta_v^5 + 78.730 \eta_v^4 - 42.528 \eta_v^3 + 13.986 \eta_v^2 - 3.3410 \eta_v + 0.81696$$

The polynomial expressions are valid for $0.05 < \eta < 1$, and the above solutions were obtained by numerical solution of partial differential equations representing the dynamic geometry of the horizontal layer. If desired, the location of the filtrate front over the entire permeable zone can be constructed by combining the above expressions for the vertical and horizontal layers. It will be understood that the effects described above are significant when "buoyancy" is relatively large; that is, when the vertically induced speed W is greater than the radial filtrate speed at the wellbore wall, $u_r$.

In accordance with a feature of the present invention, the presence of a curved segment of a vertical layer, in an invasion profile with buoyancy, is detected using resistivity logging measurements, and the vertical extent, $H_v$ of the curved segment is determined. The vertical permeability of the formation in a bed of interest can then be determined as a function of $H_v$, the porosity $\phi$, $\Delta \rho$, $\mu_{fil}$, and $t_{log}$, which is the time after drilling that the resistivity measurement were taken. The vertical permeability can be determined from $$k_v = \frac{H_v \mu_{fil} \phi}{t_{log} \Delta \rho} \quad (11)$$

which follows from equation (6) above.

In accordance with a further feature of the invention, the acceptability of provisionally determined values of formation permeability, such as the vertical component thereof, is determined by generating a model invasion profile, generating simulated resistivity logs using the model invasion profile, and accepting the provisional value of permeability if the simulated logs do not differ substantially from the measured logs.

Figure 5A:
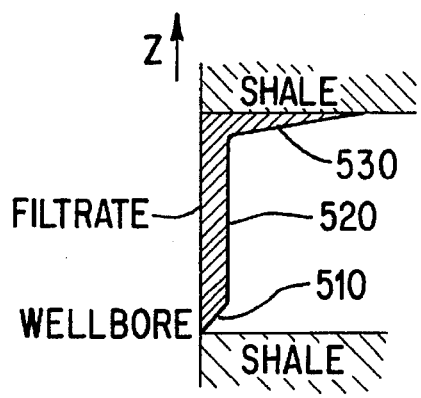
FIG. 5A is a sketch of an invasion profile from which exemplary logs are illustrated in FIGS. 5B, 5C and 5D.
Figure 5B:
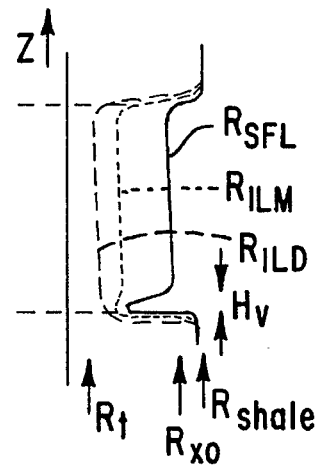
FIG. 5B illustrates three resistivity logs, at different radial depths of investigation, of a type that would be obtained when logging the FIG. 5A formation.
Figure 5C:
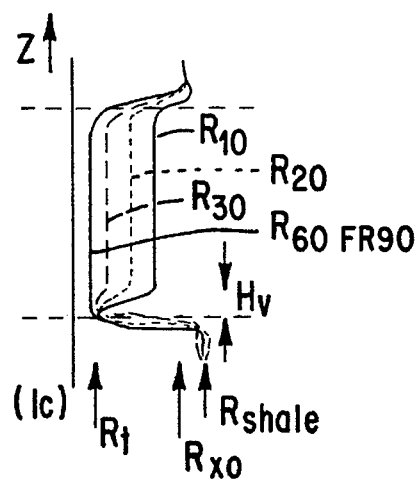
FIG. 5C illustrates several resistivity logs, at different radial depths of investigation, of a type that would be obtained when logging the FIG. 5A formation.
Figure 5D:
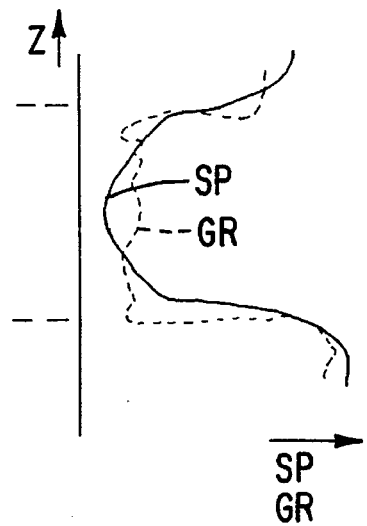
FIG. 5D illustrates representative static potential and gamma ray logs of the type that would be obtained when logging the FIG. 5A formation.

Referring to FIGS. 5A–5D, there are shown examples of representative log traces of the types obtained from the resistivity logging device(s) of the FIG. 1 embodiment in a permeable formation bed between shale shoulder beds in a case where the filtrate is lighter than the fluid in the invaded formations. In this example, fresh water filtrate invades a water zone with $R_t < R_{xo} < R_{shale}$. The approximate invasion profile is shown in FIG. 5A, and it is seen to have the characteristic pattern described in conjunction with FIGS. 2 and 3, with the shaded invasion region exhibiting a curved segment 510, a vertical straight line segment 520, and an accumulated (horizontal) layer 530. The horizontal layer is adjacent the top of the bed and the curved segment is adjacent the bottom of the bed, which follows from the buoyancy of the lighter invading filtrate for this example. FIG. 5D illustrates the SP and GR logs for the FIG. 5A example, and can be utilized, inter alia, for bed boundary determination. FIG. 5B illustrates the log traces, as a function of depth, for the DIT-SFL, which produces the shallow (radial depth of investigation) resistivity $R_{SFL}$, the intermediate resistivity $R_{ILM}$, and the deep resistivity $R_{ILD}$. FIG. 5C shows the AIT logs at radial depths of investigation of 10, 20, 30, 60 and 90 inches. In this example, the depth of invasion at the vertical straight line segment is about 15 inches at the illustrated time. In both the DIT-SFL logs of FIG. 5B and the AIT logs of FIG. 5C, the deepest resistivity measurements ($R_{ILD}$ for FIG. 5B, and $R_{60}$ and $R_{90}$ for FIG. 5C) see substantially only the uninvaded formation, and exhibit a relatively low resistivity in the permeable water-containing bed. The shallowest measurements $R_{SFL}$ (for FIG. 6) and $R_{10}$ (for FIG. 7) are most strongly influenced by the invaded zone in this example, and exhibit resistivities characteristic of the fresh water filtrate in the bed. This resistivity is seen to be exhibited over the portions of the bed where the vertical straight-line segment 520 and the accumulated (or horizontal) layer 530 are located. However, in the region of the curved segment 510, there is seen to be a horn in the shallow resistivity logs, the horn having a vertical extent which approximately corresponds to the vertical extent of the curved segment, $H_v$. The logs having intermediate depths of radial investigation ($R_{ILM}$ in FIG. 5B, and $R_{20}$ and $R_{30}$ in FIG. 5C), which are influenced to a much smaller extent by the invaded zone, exhibit a smaller perturbation in the region of the curved segment. The horizontal layer does not have sufficient vertical extent to have a noticeable effect on these resistivity logs. However, in conditions where $k_h$ is approximately equal to $k_v$, the horizontal layer may cause a noticeable deflection on shallow resistivity logs in the direction of $R_{xo}$. Also, if resistivity devices(s) with higher vertical resolution are used, the horizontal layer would exhibit larger effects. In the shale regions, where there is no invasion, all resistivity measurements exhibit the same relatively high resistivity.

Figure 6B:
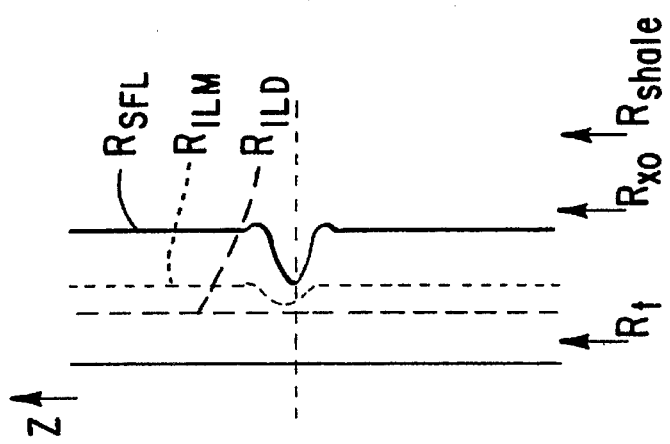
FIG. 6B illustrates three resistivity logs, having different radial depths of investigation, of the type that would be obtained when logging the formation of FIG. 6A.
Figure 6A:
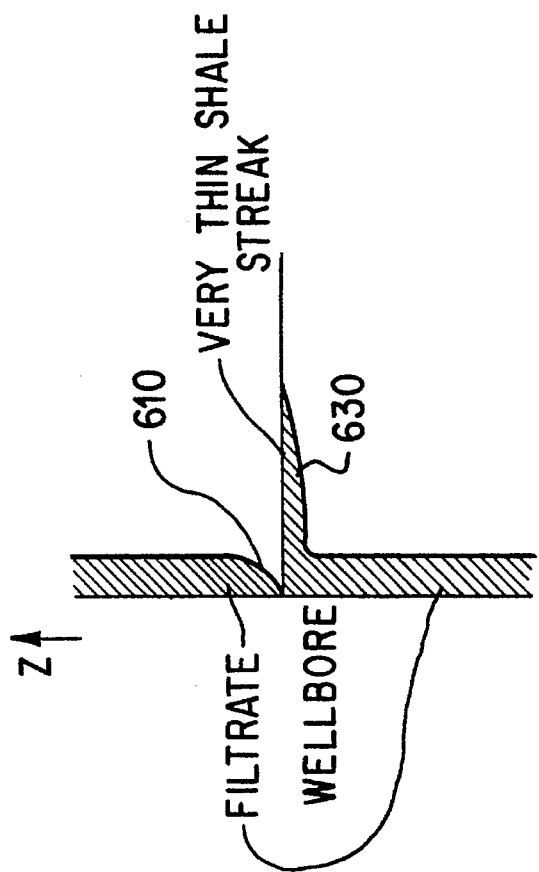
FIG. 6A illustrates an invasion profile in a permeable bed with a very thin shale streak, invaded by filtrate that is less dense than the formation fluid.

FIG. 6A illustrates a buoyancy induced invasion profile for a situation where there is a very thin shale streak in a permeable bed which, again, is invaded by fresh water filtrate. Again, the filtrate is lighter than the formation fluid, and will tend to rise, thereby giving rise to a horizontal layer 630 below the shale streak and a curved segment 610 above the shale streak. FIG. 6B illustrates the DIT-SFL logs for this situation where, again, $R_t > R_{xo} > R_{shale}$. As before, the resistivity log for the deepest radial depth of investigation, $R_{ILD}$, sees the uninvaded formation, and is not affected by the very thin shale steak or the invasion. Also, as before, the shallowest measurement exhibits a horn that results from the curved segment (610), most of the vertical extent of the horn being above the shale streak. The excursion of the horn goes toward $R_t$ rather than toward $R_{shale}$. The intermediate depth of investigation measurement ($R_{ILM}$) exhibits a smaller perturbation due to the curved segment 610. Again, it is believed that the accumulated (horizontal) layer 630 does not noticeabley affect these logs. Any significant permeability in the shale would allow the accumulating layer of filtrate to pass vertically through it, resulting in deeper invasion in the bed above the shale, thus reducing or eliminating the signature in the shallow measurement (i.e., the horn). A distinct signature indicates that the radial extent of the impermeable shale is at least as large as the accumulated layer.

Figure 7A:
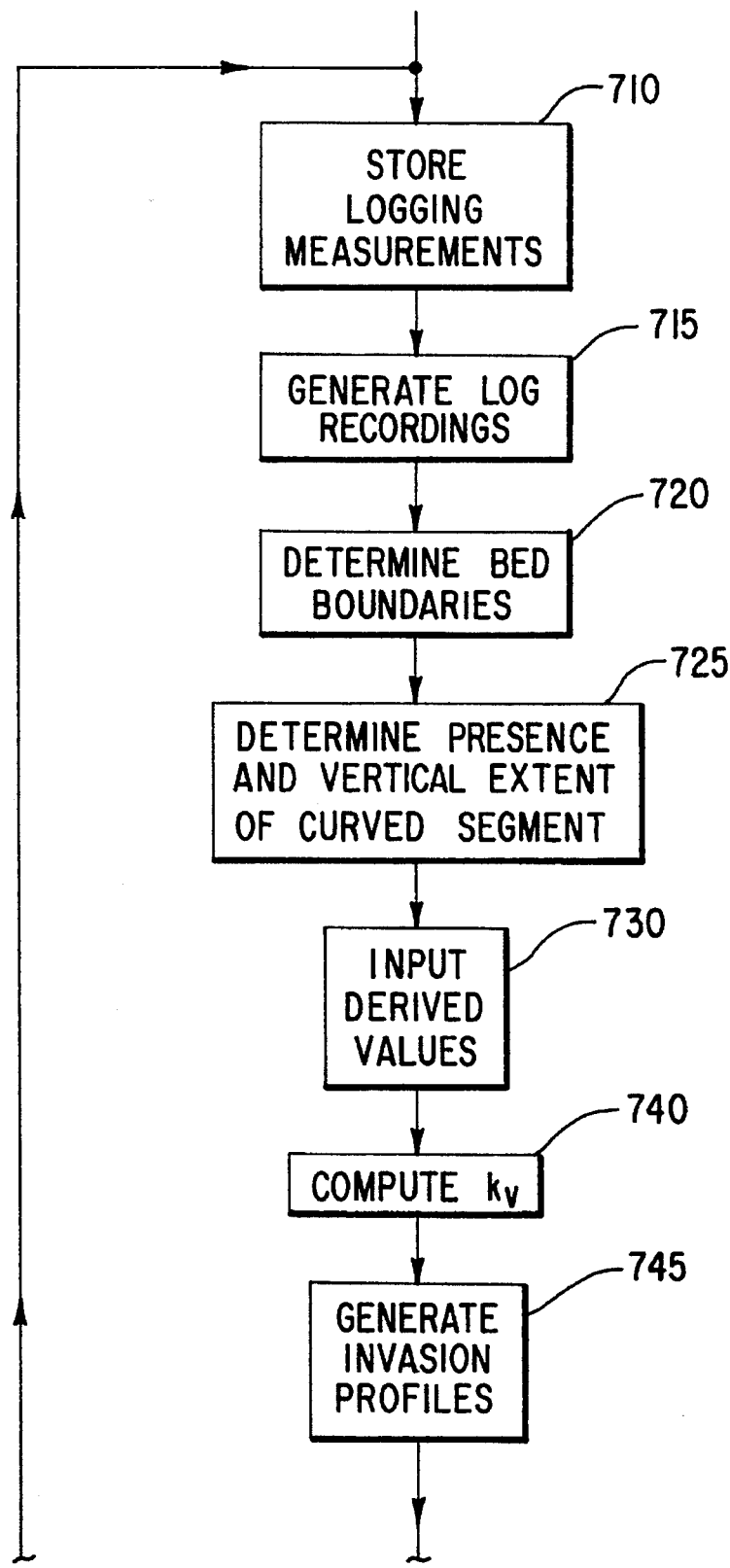
FIG. 7, which includes FIGS. 7A and 7B placed one above the other, is a flow diagram of a routine, in accordance with an embodiment of the invention, that can be utilized for programming the processor of the FIG. 1 computer module.
Figure 7B:
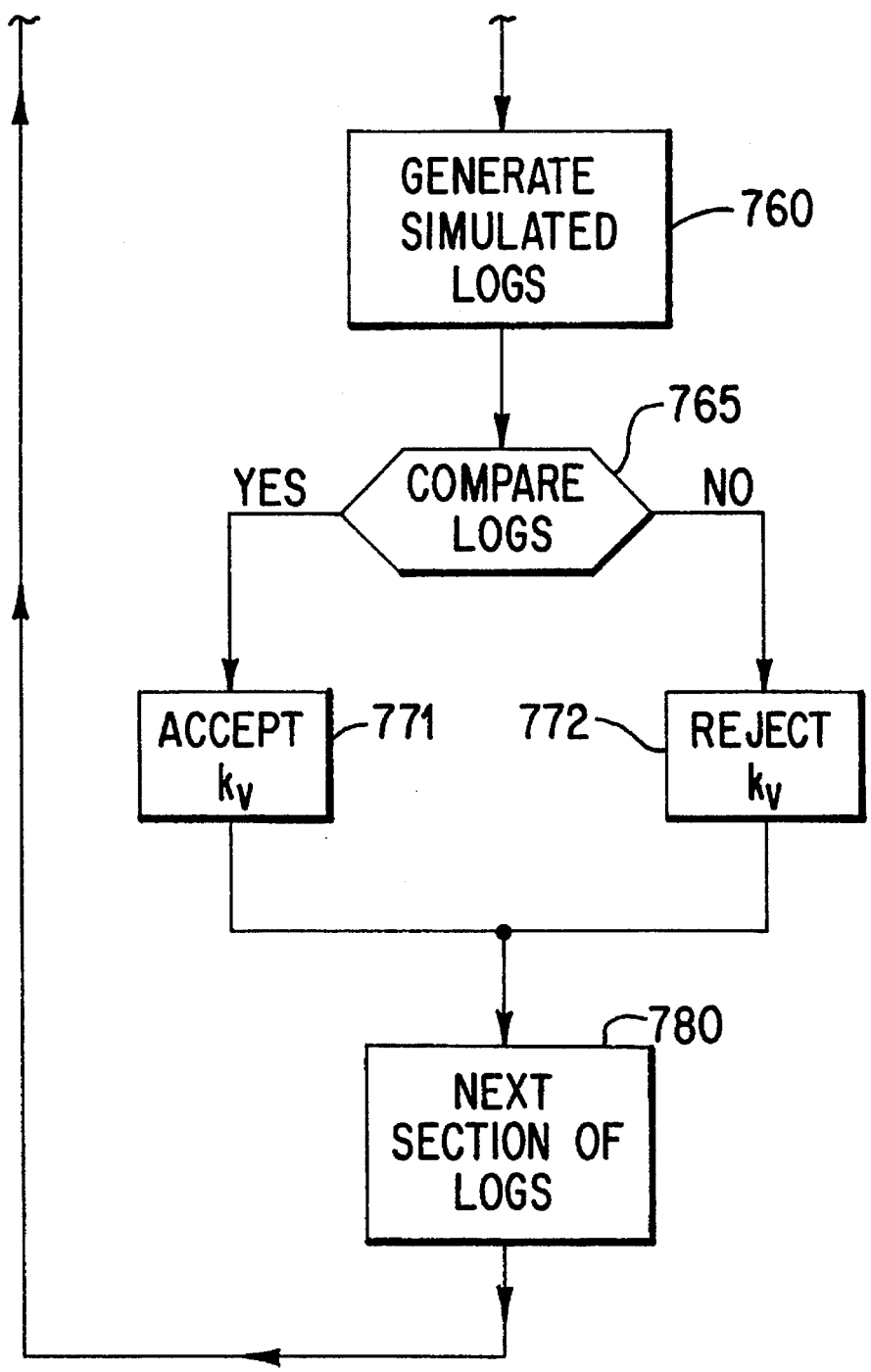

Referring to FIG. 7, there is shown a flow diagram of a routine for programming the processor of computing module 100 (FIG. 1) in accordance with an embodiment of the invention. The block 710 represents the storing of logging measurements from the tool string of the FIG. 1 embodiment, to obtain a plurality of resistivity and other logs, as described. The stored logs can be displayed and/or recorded, in conventional fashion, by recorder 90, as represented by the block 715. The block 720 represents the determination of bed boundaries from the SP and/or GR logs, which can be performed in conventional fashion by detecting, for example, the types of excursions illustrated in FIG. 5D.

The block 725 represents determination of the presence of a curved segment (of the type illustrated, for example, at 510 in FIG. 5A) from resistivity logs having relatively shallow and relatively deep radial depths of investigation. In the present embodiment, a curved segment is identified by observing a large deflection (horn), at a bed boundary, in the shallow resistivity log toward the resistivity of the deep resistivity log. The extent of the horn (in the borehole axial direction), from which one can determine $H_v$, is taken in this embodiment to be the distance between the boundary and the position where the horn reaches the bed resistivity. The block 730 represents the deriving of information, including measurement information and/or information obtained from logging, drilling parameters, local geology information, and the like, to obtain (and/or receive, by operator input) values for porosity, $\phi$, the time since logging, $t_{log}$, and the densities of the fluids involved and the viscosity of the filtrate. For example, porosity, as a function of depth, may be obtained from the logging device 43 of FIG. 1, the fluid properties may be obtained from the known mud properties and local geology information, and the time since drilling of the section of borehole being considered may be derived by the operator from standard drilling record information at the well site.

The block 740 is next entered, this block representing the determination of a provisional value of vertical permeability, $k_v$, in accordance with relationship (11) above. The block 745 is then entered, this block representing the generation of an invasion profile of the formations from the resistivity logs and the vertical permeability determined at the block 740.

In the well logging art, so-called "inverse modeling" and so-called "forward modeling" are used for obtaining models of formations, or of simulated logging device responses, for purposes of evaluating the nature of subsurface formations. [Reference can be made to B. Anderson et al., "ELMOD—Putting Electromagnetic Modeling To Work To Improve Resistivity Log Interpretation", Transactions of SPWLA 30th Annual Logging Symposium, June, 1989; and D. Allen et al., "Invasion Revisited", Oilfield Review, July, 1991; and A. Q. Howard, "A New Invasions Model For Resistivity Log Interpretation", The Log Analyst, March-April, 1992.] In inverse modeling, one may have measurements from a plurality of logging devices (such as resistivity logs) and, from the logs, develop a model of the formations, for example a model which delineates bed and invasion geometries and resistivities. Conversely, a forward model for a particular logging tool can begin with a formation model and is used to derive a simulated log that would be produced by that logging tool traversing a borehole though the formation model. For example, in forward modeling of a resistivity tool, such as an induction tool having a number of coils, the tool characteristic is readily derived from the physical characteristics of the coils, their locations, and the signals applied thereto. In the present embodiment, a model, with buoyancy taken into account, is developed using equations (3) and (5), as indicated, and the previously determined provisional value of $k_v$. If desired, a model which does not take buoyancy into account (i.e., with a cylindrical invasion profile and no vertical movement of the fluids considered), can be developed for comparison purposes. Next, the block 760 represents generation of simulated logs from the formation model(s) using forward modeling. In this example, the simulated logs for the DIT-SFL are developed from the previously derived invasion model which takes buoyancy into account. [If desired, simulated logs, without buoyancy, can also be generated by forward modeling from the model without buoyancy.] The simulated logs (with buoyancy) are then compared to the actual logs (decision block 765), and the provisional value of $k_v$ is accepted (block 771) if the comparison is favorable, and rejected (block 772) if it is not favorable. Various criteria can be used for the comparison. For example, the presence of the horn in the shallow resistivity logs can be required to match within a predetermined percentage in position and amplitude, as a condition of acceptance. The next section of the logs can then be processed (block 780), with the block 710 being re-entered to initialize.

In relatively thin beds, in which the vertical layer has achieved its final shape at the time of logging (T<$t_{log}$), the resistivity logs can determine, at most, $u_f/k_v$. This can be seen as follows. Since the vertical layer has achieved its final shape, the radial position of the invasion front is given by equation (3). Again, if $\mu_{fil}$, $\Delta\rho$, $R_{wb}$, and $H_{fo}$, are determined from logs, local knowledge, or laboratory analysis (as above), then this expression for the position of the front represents a one parameter family of shapes, the parameter being the remaining unknown quantity $u_f/k_v$. The value of $u_f/k_v$ can then be determined such as by iteratively forward modeling the response of the resistivity tool(s) until the resistivity logs generated by the forward modeling calculations approximately matches those on the field log. Thus, obtaining the vertical permeability in thin beds requires the additional knowledge of $u_f$, the radial speed of the filtrate as it enters the bed. Since $u_f$ depends primarily on the properties of the mud and the shear stress on the wellbore wall produced by the mud flowing through the wellbore, and not on the formation properties, then the value of $u_f$ evaluated in thick neighboring beds may be used. [In the thick beds, $u_f$ can be determined from the resistivity logs associated with the vertical straight-line segment of the vertical layer as expressed by equation (5), with the diameter of invasion determined such as by inversion modeling the resistivity logs or by iteratively forward modeling the resistivity tool(s).]

Figure 8:
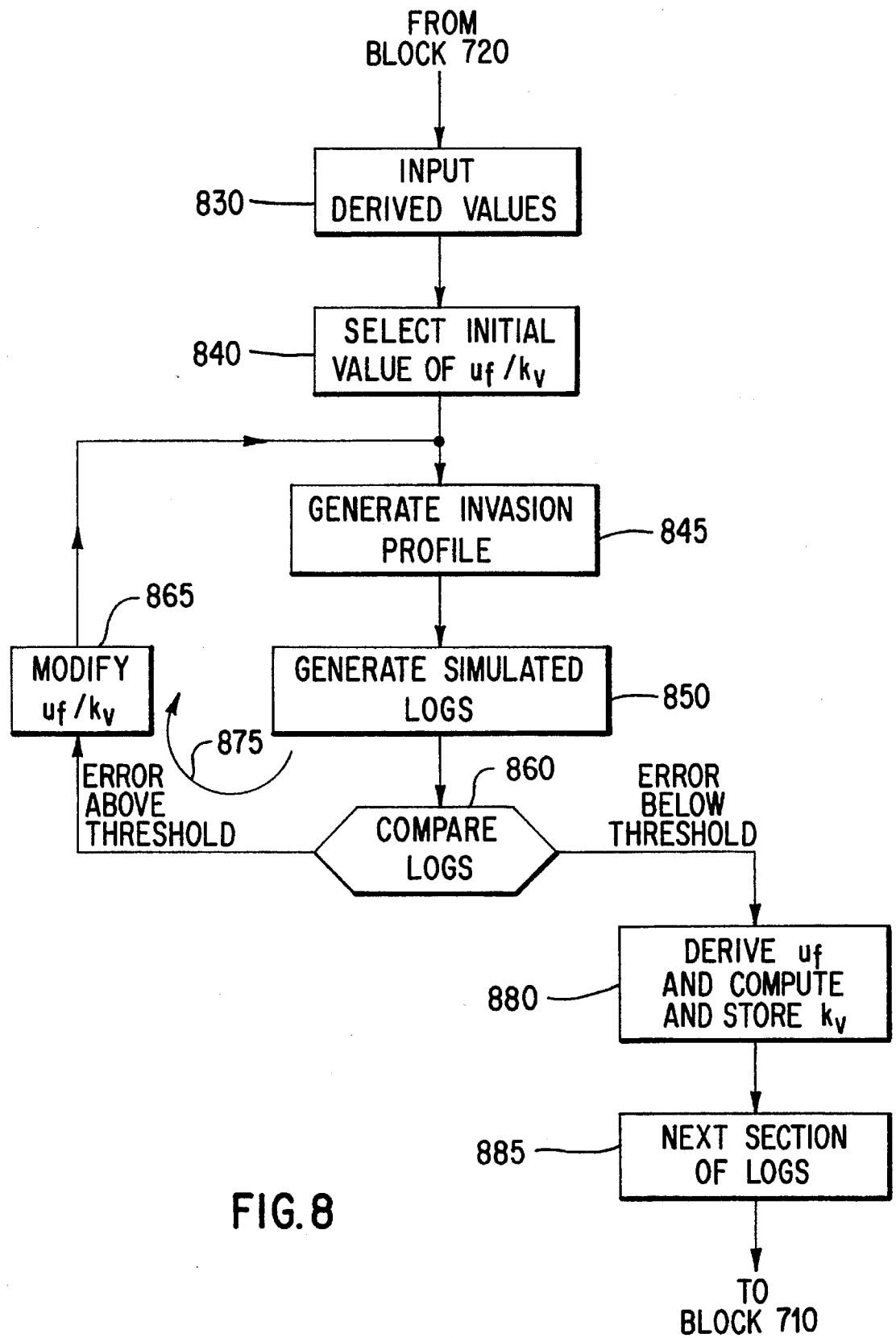
FIG. 8 is a flow diagram of a routine, in accordance with another embodiment of the invention, that can be utilized for programming the processor of the FIG. 1 computer module.

Referring to FIG. 8, there is shown a flow diagram of a routine for controlling the processor of computing module 100 to obtain a log of vertical permeability values using the type of process just described. The portion of the FIG. 7 routine described in conjunction with the blocks 710–720 would be the same as previously described. The block 830 corresponds to the block 730 of the FIG. 7 routine. The block 840 is then entered, this block representing selection of an initial model value of $u_f/k_v$. A conductivity model with an invasion profile that takes buoyancy into account is then generated (block 845), as previously described, using a forward model and $u_f/k_v$ in equation (3) to obtain r (radius of the invasion front) as a function of z (depth or axial distance). Simulated logs can then be generated (block 850) using forward modeling, as previously described. The decision block 860 is then entered, this block representing the comparison of the simulated logs with the actual measured (field) logs. There are various known ways in which the comparison can be implemented, such as by computing a root mean square error over a particular region. If the error is above a predetermined threshold level, the model value of $u_f/k_v$ is modified (block 865), the block 845 is re-entered, and the loop 875 continues until the error is less than the predetermined error threshold value. The block 880 is then entered, this block representing the deriving of $u_f$ and the storage of the resultant vertical permeability, $k_v$. As described above, the value of $u_f$ can be determined, for example, from adjacent beds. The next section of the logs can then be considered (block 885), and the block 710 is re-entered for further processing.

The invention has been described with reference to particular preferred embodiments, but variations within the spirit and scope of the invention will occur to those skilled in the art. For example, while formation beds used for illustration have been shown perpendicular to the borehole (zero dip), it will be understood that the invention is equally applicable to dipping formations.

We claim:

1. A method for determining the permeability of formations surrounding a borehole drilled in the earth using drilling fluid, comprising the steps of:

suspending a logging tool in the borehole;

producing a plurality of resistivity measurements, having respectively different radial depths of investigation, as said logging device is moved through said borehole, to obtain a plurality of resistivity logs;

determining the presence of a buoyancy marker in said resistivity logs in a formation bed invaded with filtrate from said drilling fluid, and the extent of said buoyancy marker; and determining permeability of said formations as a function of the extent of said buoyancy marker.

2. The method as defined by claim 1, further comprising deriving of the elapsed time between the drilling of the portion of the borehole for which permeability is being determined and the logging of said resistivity measurements in said portion of the borehole, and wherein said permeability is determined as a function also of said elapsed time.

3. The method as defined by claim 1, wherein said step of determining permeability comprises determining the vertical permeability of said formations.

4. The method as defined by claim 2, wherein said step of determining permeability comprises determining the vertical permeability of said formations.

5. The method as defined by claim 1, wherein said plurality of resistivity measurements, having respectively different depths of investigation, comprises at least three resistivity measurements from which at least three logs are obtained.

6. The method as defined by claim 4, wherein said plurality of resistivity measurements, having respectively different depths of investigation, comprises at least three resistivity measurements from which at least three logs are obtained.

7. The method as defined by claim 1, wherein said buoyancy marker comprises a curved segment in the invasion profile of said bed, and wherein the extent of said marker is determined from the extent of a horn in the resistivity log having the relatively shallowest radial depth of investigation of said resistivity logs.

8. The method as defined by claim 4, wherein said buoyancy marker comprises a curved segment in the invasion profile of said bed, and wherein the extent of said marker is determined from the extent of a horn in the resistivity log having the relatively shallowest radial depth of investigation of said resistivity logs.

9. The method as defined by claim 6, wherein said buoyancy marker comprises a curved segment in the invasion profile of said bed, and wherein the extent of said marker is determined from the extent of a horn in the resistivity log having the relatively shallowest radial depth of investigation of said resistivity logs.

10. The method as defined by claim 8, wherein said logging tool further includes means for generating a log indicative of bed boundaries, and wherein said step of determining a buoyancy marker in said resistivity logs comprises locating said horn at one of said bed boundaries.

11. The method as defined by claim 9, wherein said logging tool further includes means for generating a log indicative of bed boundaries, and wherein said step of determining a buoyancy marker in said resistivity logs comprises locating said horn at one of said bed boundaries.

12. The method as defined by claim 6, further comprising generating an output log of said determined permeability.

13. A method for determining the vertical permeability of formations surrounding a borehole drilled in the earth using drilling fluid, comprising the steps of:

suspending a logging tool in the borehole;

producing a plurality of resistivity measurements, having respectively different radial depths of investigation, as said logging device is moved through said borehole, to obtain a plurality of resistivity logs;

determining the presence of a buoyancy marker in said resistivity logs in a formation bed invaded with filtrate from said drilling fluid, and the extent of said buoyancy marker;

determining permeability of said formations as a function of the extent of said buoyancy marker;

determining an invasion profile for said bed from said resistivity logs and said provisional vertical permeability;

generating a plurality of simulated resistivity logs from said invasion profile;

comparing said simulated resistivity logs with the resistivity logs obtained from measurements to determine whether the provisional vertical permeability is acceptable; and outputting the acceptable vertical permeability value.

14. The method as defined by claim 13, further comprising deriving of the elapsed time between the drilling of the portion of the borehole for which permeability is being determined and the logging of said resistivity measurements in said portion of the borehole, and wherein said permeability is determined as a function also of said elapsed time.

15. The method as defined by claim 14, wherein said plurality of resistivity measurements, having respectively different depths of investigation, comprises at least three resistivity measurements from which at least three logs are obtained.

16. The method as defined by claim 14, wherein said buoyancy marker comprises a curved segment in the invasion profile of said bed, and wherein the extent of said marker is determined from the extent of a horn in the resistivity log having the relatively shallowest radial depth of investigation of said resistivity logs.

17. The method as defined by claim 15, wherein said buoyancy marker comprises a curved segment in the invasion profile of said bed, and wherein the extent of said marker is determined from the extent of a horn in the resistivity log having the relatively shallowest radial depth of investigation of said resistivity logs.

18. The method as defined by claim 14, wherein said logging tool further includes means for generating a log indicative of bed boundaries, and wherein said step of determining a buoyancy marker in said resistivity logs comprises locating said horn at one of said bed boundaries.

19. The method as defined by claim 17, wherein said logging tool further includes means for generating a log indicative of bed boundaries, and wherein said step of determining a buoyancy marker in said resistivity logs comprises locating said horn at one of said bed boundaries.

20. The method as defined by claim 14, further comprising generating an output log of said determined permeability.

21. Apparatus for determining the permeability of formations surrounding a borehole drilled in the earth using drilling fluid, comprising:

a logging tool suspended in the borehole;

means for producing a plurality of resistivity measurements, having respectively different radial depths of investigation, as said logging device is moved through said borehole, to obtain a plurality of resistivity logs;

means for determining the presence of a buoyancy marker in said resistivity logs in a formation bed invaded with filtrate from said drilling fluid, and the extent of said buoyancy marker; and means for determining permeability of said formations as a function of the extent of said buoyancy marker.

22. Apparatus as defined by claim 21, wherein said permeability is determined as a function also of the elapsed time between the drilling of the portion of the borehole for which permeability is being determined and the logging of said resistivity measurements in said portion of the borehole.

23. Apparatus as defined by claim 22, wherein said logging tool further includes means for generating a log indicative of bed boundaries, and wherein said means for determining a buoyancy marker in said resistivity logs comprises means for locating said horn at one of said bed boundaries.

24. Apparatus as defined by claim 22, further comprising means for generating an output log of said determined permeability.

25. A method for determining the permeability of formations surrounding a borehole drilled in the earth using drilling fluid, comprising the steps of:

a) suspending a logging tool in the borehole;

b) producing at least three resistivity measurements, having respectively different radial depths of investigation, as said logging device is moved through said borehole, to obtain at least three resistivity logs;

c) selecting a model value of vertical permeability for a formation bed invaded with filtrate from said drilling fluid;

d) generating from said resistivity logs and said value of vertical permeability, a formation resistivity model having an invasion profile which includes the buoyancy effect of gravity and depends on said model value of vertical permeability;

e) generating simulated logs from said formation resistivity model;

f) comparing the simulated logs with the logs obtained from resistivity measurements to obtain an error based on dissimilarity between the compared logs;

g) modifying the model value of vertical permeability;

h) repeating steps (d) through (g) until a predetermined criterion of said error is met; and i) outputting said model value of vertical permeability as the vertical permeability in said formation bed.

26. The method as defined by claim 25, wherein said model value of vertical permeability is in the form of a model ratio of the radial speed of filtrate in said bed to vertical permeability in said bed.

27. The method as defined by claim 26, further comprising repeating the recited method steps for other beds, and generating a log of vertical permeability.

* * * * *